O. B. BLACKWELL, T. SHAW AND C. J. KOUKOL.
ELECTRICAL MEASURING APPARATUS.
APPLICATION FILED MAR. 4, 1918.

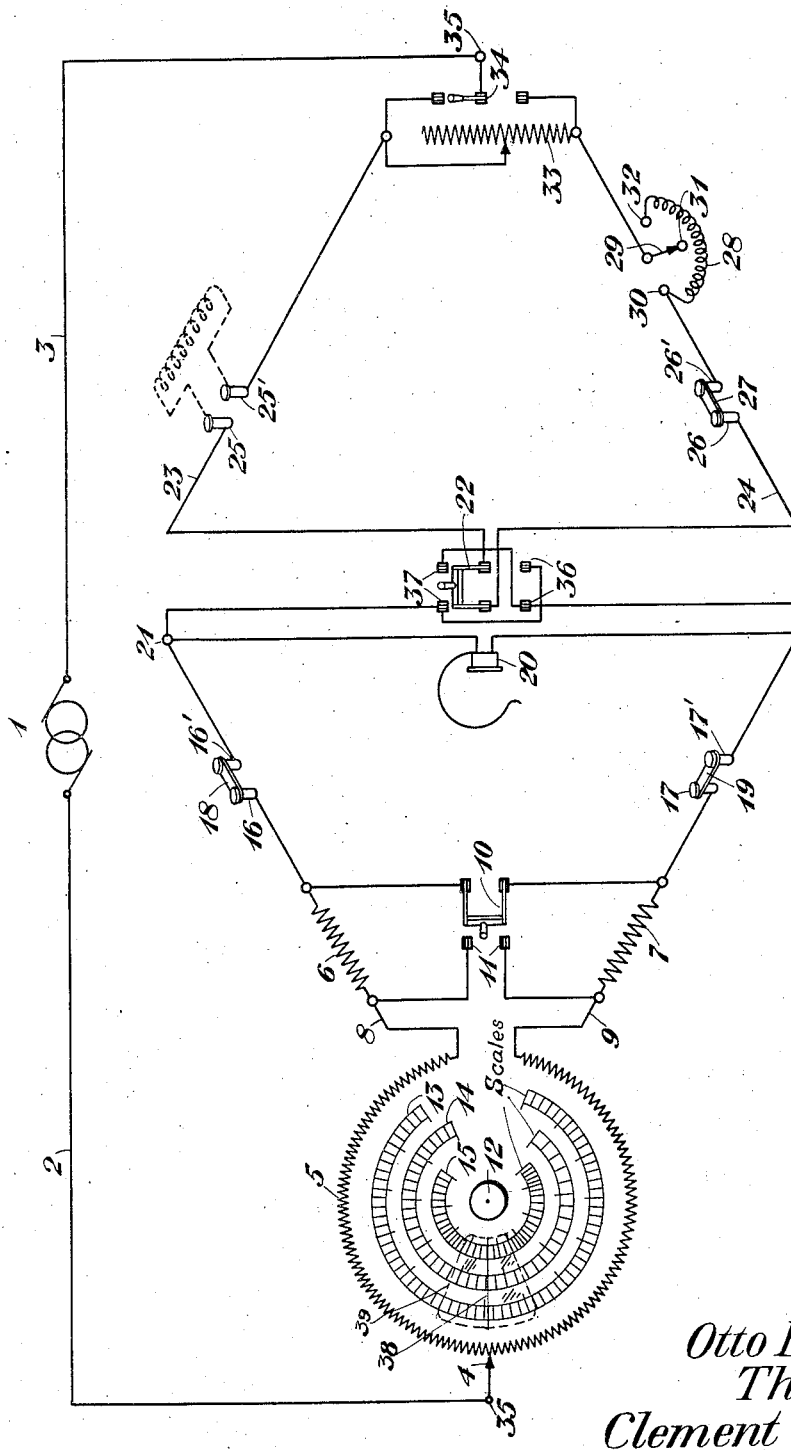

1,329,949.

Patented Feb. 3, 1920.
2 SHEETS—SHEET 2.

INVENTORS
Otto B. Blackwell
Thomas Shaw
Clement J. Koukol
BY
ATTORNEY

UNITED STATES PATENT OFFICE.

OTTO B. BLACKWELL, OF GARDEN CITY, NEW YORK, THOMAS SHAW, OF HACKENSACK, NEW JERSEY, AND CLEMENT J. KOUKOL, OF ELMHURST, NEW YORK, ASSIGNORS TO AMERICAN TELEPHONE AND TELEGRAPH COMPANY, A CORPORATION OF NEW YORK.

ELECTRICAL MEASURING APPARATUS.

1,329,949.  Specification of Letters Patent.  Patented Feb. 3, 1920.

Application filed March 4, 1918. Serial No. 220,316.

*To all whom it may concern:*

Be it known that we, OTTO B. BLACKWELL, THOMAS SHAW, and CLEMENT J. KOUKOL, residing at Garden City, Hackensack, and Elmhurst, respectively, in the counties of Nassau, Bergen, and Queens, respectively, and States of New York, New Jersey, and New York, respectively, have invented certain Improvements in Electrical Measuring Apparatus, of which the following is a specification.

This invention relates to electrical measuring apparatus, and more particularly to a portable device for measuring the effective inductance and the effective resistance of impedance coils used in telephone transmission circuits.

The portable type of impedance measuring apparatus used heretofore comprised unity ratio branches, an inductance standard supplemented by a variable inductometer, a variable resistance for balancing the effective resistance of the coil under test, and a portable source of alternating electromotive force of telephonic frequency. The inductance standard consisted in an iron core coil of the type usually employed in loading telephone circuits. The variable inductometer consisted in an induction coil having a straight movable iron core, to which was attached a pointer, and with which was associated a fixed calibrated scale which showed the inductance of the coil winding for the different linear positions of the core. The circuit was so arranged that the inductometer could be placed in series with either the inductance standard or the coil under test. This apparatus has been found to be unsatisfactory due to the changes from time to time in the magnetic characteristics of the iron core of the inductance standard, and of the inductometer, which rendered it necessary to recalibrate these inductances frequently in order to insure accuracy of measurement.

The principal objects, therefore, of this invention are to provide portable apparatus for measuring effective inductance and effective resistance, in which the necessity for recalibration will be substantially eliminated, and also to provide apparatus that will have a wider range of measurement than any heretofore used.

Figure 3:
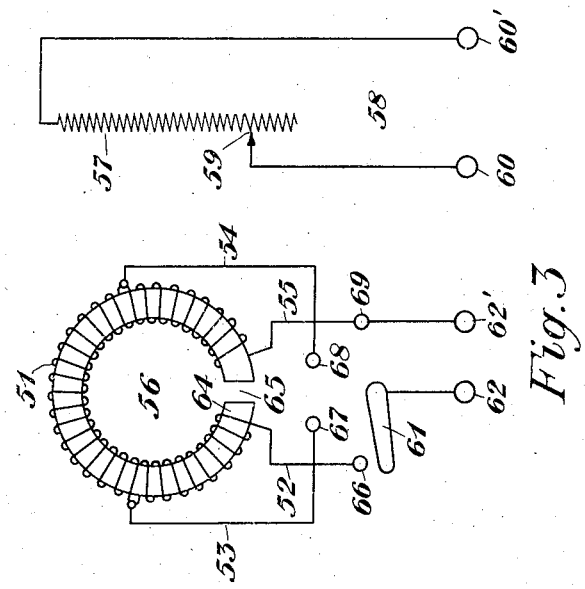
Figure 2:
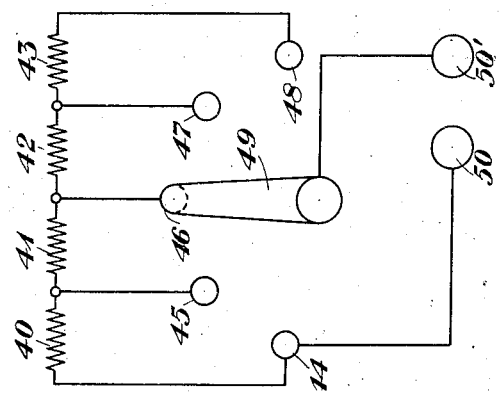

This invention will be more clearly understood by referring to the accompanying drawings, of which Figure 1 shows schematically a circuit arrangement of this measuring apparatus, and Figs. 2 and 3 are diagrams of means whereby the range of measurement of the circuit shown in Fig. 1 may be greatly increased.

In Fig. 1 a source of electromotive force 1 of telephonic frequency and having substantially a sine wave form, is connected by means of conductors 2 and 3 to terminals 35 and 35' respectively, constituting opposite junctions of the Wheatstone balance. Terminal 35 is connected to a contactor 4 which is in contact with the variable resistance 5 which has a maximum value of 200 ohms. In series with the said variable resistance and located in branches 8 and 9 respectively are fixed resistances 6 and 7, each having a value of 450 ohms. The switch 10 is connected with said fixed resistances so that the said resistances may be either short circuited or left effectively connected in said branches, depending upon the position of the switch. The variable resistance 5 is mounted upon the periphery of a drum which may be rotated by means of a handle 12, but it is apparent that the same result may be effected by holding the said resistance in a fixed position and rotating the said contactor 4. To one end of said drum are attached a plurality of concentric scales 13, 14 and 15, calibrated decimally, which indicate the ratios of the resistance in one branch of the system to that in the other branch, for various positions of the variable resistance relative to contactor 4. A hair line 38 marked upon a glass window 39 in the face plate of this apparatus serves as an index for the scales. The outer and middle scales 13 and 14 respectively indicate the ratio of the branches when the fixed resistances 6 and 7 are connected in series with the variable resistance 5, scale 13 being marked to indicate the ratios between the limits .7 and 1.4, scale 14 showing the inverse ratios. The third or innermost scale 15 shows the ratio of the branches when the fixed resistances 6 and 7 are short circuited, and is calibrated between the limits .1 and 10.

Terminals 16 and 16' and 17 and 17', which are electrically connected by straps 18 and 19 respectively, the functions of which will be stated hereafter, are inserted in the ratio branches 8 and 9. A receiver 20 is connected between terminals 21 and 21' representing the other opposite junctions of the balance, to indicate when a balanced condition has been obtained. A switch 22 is connected into the circuit whereby the branches 23 and 24 may be interchanged electrically with respect to the ratio branches 8 and 9. Terminals 25 and 25' are inserted in branch 23 to connect into the system an impedance coil of unknown value which it is desired to measure. Terminals 26 and 26', the function of which will be described hereafter, are inserted in branch 24, and are electrically connected by means of strap 27. In branch 24 is inserted a variable inductance standard comprising an air core inductance coil 28 with taps taken from the ends and an intermediate point whereby two values of inductance, viz., .1 henry and .2 henry, may be obtained, and a movable arm 29 which makes contact with contact points 30, 31 and 32 to which said taps are connected. A variable resistance 33, which by means of switch 34 may be connected to either branch 23 or branch 24, has been inserted for the purpose of balancing the effective resistance of the coil under test. The arm of switch 34 is connected to terminal 35' which is connected by conductor 3 to the source of alternating electromotive force.

This invention will be more fully understood from the following description of the method of operating the apparatus in which the invention is embodied.

If the coil to be measured has upon it a single winding or if said coil has a plurality of windings, and it is desired to measure the inductance and effective resistance of each winding separately, the terminals of the winding to be measured are connected to terminals 25 and 25'. If said coil has a plurality of windings and it is desired to measure the total inductance or total effective resistance of all of said windings, they are connected in series-aiding order, and the two free end-terminals of the windings are connected to the said terminals. Switch 10 is opened so that resistances 6 and 7 will be effectively connected into the ratio branches 8 and 9 respectively. Switch 22 should be thrown so that the blades will engage either contacts 36 or 37, assume, for illustration, contacts 36. The arm 29 of the three-point switch is arranged to make contact either with contact point 31 or 32, whereby an inductance of either .1 henry or .2 henry is connected into branch 24, the value selected depending upon the proximate value of the inductance of the coil to be measured. Switch 34 should be thrown so that resistance 33 may be connected in series with the coil having less resistance, if this is known; otherwise, it will be necessary to try to balance the system in order to determine the proper direction in which the switch should be thrown. The apparatus arranged in the manner described is adapted to measure coils having inductances varying from .07 henry to .28 henry and also the effective resistance of said coils; the arrangements necessary to measure coils having inductances lower than .07 henry or greater than .28 henry will be described hereinafter.

In order to bring the bridge system to a balance it is necessary to equalize and to bring into the same phase the voltage drops due to the impedance in the two sides of the system. To obtain this result the variable resistance 5 which, as previously shown forms part of the ratio branches 8 and 9, is adjusted by rotating the handle 12 which is rigidly attached to the drum upon which the said resistance is mounted until a tone of minimum volume is indicated by receiver 20. If the inductance of the coil to be tested and of coil 28 were of the same value, or if the effective resistances of said coils were likewise the same, this adjustment of the variable resistance 5 would produce a balanced condition of the system and substantially no tone would be indicated by the receiver. Since this condition of equality rarely occurs in practice, it is generally necessary, in order to improve the degree of balance, to add resistance to the coil of less resistance, by adjusting variable resistance 33. This increase in the resistance of one side of the balance reduces the current therein, and, in consequence, the value of the voltage drop due to impedance and also its phase angle are changed. This change generally necessitates a slight readjustment of the variable resistance 5 in order to produce perfect balance. As previously stated, it is necessary that the electromotive force produced by source 1 shall have substantially sine wave form, since it is impracticable, due to the presence of over tones in receiver 20, to establish a balance if the electromotive force varies greatly from a sine wave form.

When a balanced condition is indicated by receiver 20, the ratio of the resistance in branch 8 to the resistance in branch 9 is indicated by scale 13.

In order to check the accuracy of the reading, switch 22 may be reversed so that its blades will engage contacts 37, thereby interchanging electrically the relation of branches 23 and 24 to the ratio branches 8 and 9. The system is again balanced in the manner above-described and when a balanced condition has been obtained, the ratio of the resistance in branch 8 to the resistance in branch 9, will be indicated by scale 14. By inserting these ratios and the known values of inductance and resistance in the well-known formulæ for a Wheatstone balance, the unknown values of inductance and effective resistance may be readily computed.

If it is desired to measure inductances which are less than .07 henry, it is necessary to short-circuit the resistances 6 and 7 by closing switch 10. Switch 26 is thrown so that its blades will engage contacts 36, the terminals of the winding of the impedance coil of unknown value are connected as previously described to terminals 25 and 25', and the same method of balancing the system as has been described, is followed.

When a balanced condition has been obtained, the ratio of the resistance in branch 8 to that in branch 9 should be read on scale 15. By applying these values to the well-known equations for a Wheatstone balance, the unknown values of the inductance and the effective resistance of a coil under test, may be determined.

If it is desired to measure the effective inductance and the effective resistance of coils having values larger than those heretofore stated, it may be done by using the additional apparatus diagrammatically shown in Figs. 2 and 3.

Fig. 2 shows an arrangement for increasing the range of the ratio branches, consisting in a variable resistance having a plurality of units 40, 41, 42 and 43 arranged in series and connected with a plurality of contact points 44, 45, 46, 47 and 48. Contact point 44 is connected with terminal 50, and a movable arm 49, capable of making contact with each of the said contact points, is connected with terminal 50', whereby one or more of said resistance units may be connected in series between the said terminals.

Fig. 3 shows a variable inductance standard 56 of greater value than the inductance standard shown in Fig. 1 and a variable resistance standard 58, both of which are adapted for connection with the bridge system shown in Fig. 1, whereby the range of measurement of the said system may be increased. The variable inductance standard 56 consists in a toroidal iron core 64 upon which is placed a winding 51 having a plurality of taps 52, 53, 54 and 55 connected with a plurality of contact points 66, 67, 68 and 69. A movable arm 61, connected with a terminal 62, is capable of making contact with any of said contact points. Contact point 69 is connected with terminal 62'. The variable resistance standard 58 consists in a fixed resistance 57, connected with terminal 60', and a contactor 59, connected with terminal 60, and capable of being moved along resistance 57, thereby varying the resistance between terminals 60 and 60'.

The inductance standard 56 has been designed to have an inductance of 4 henries at 800 periods per second and by means of the taps at intermediate points of the winding an inductance of 1 henry or 2 henries may be obtained. In order to secure inductance stability and thereby avoid the magnetization troubles experienced in the continuous iron core coils, heretofore used, the said core of the inductance is provided with an air-gap 65, and is thus discontinuous.

The apparatus shown in Figs. 2 and 3 is associated with that shown in Fig. 1 in the following manner:—

The variable resistance shown in Fig. 2 is connected into ratio branch 9 by removing strap 19 and connecting terminals 50 and 50' with terminals 17 and 17' respectively. Switch 10 is opened so as to leave resistances 6 and 7 effectively connected into branches 8 and 9 respectively of the system. Arm 29 of the standard air core inductance coil is swung into contact with contact point 30 thereby effectively removing said standard coil from branch 24. If the effective resistance of the coil to be tested is known to be greater than that of the inductance standard 56, the variable resistance 58 is connected in series with the inductance standard 56, by strapping together terminals 62' and 60, and connecting terminals 62 and 60' to terminals 26 and 26' respectively, after removing strap 27. If, however, the effective resistance of the coil to be tested is known to be less than that of the inductance standard 56, the said inductance standard is connected into branch 24, by connecting terminals 62 and 62' to terminals 26 and 26' respectively, after removing strap 27, and the variable resistance 58 is connected into branch 23 in series with the coil to be tested. As previously described, switch 34 is thrown so that the variable resistance 33 will be connected in series with the coil of less resistance. The coil to be measured is connected to terminals 25 and 25' and the procedure to be followed in determining the effective inductance and the effective resistance of the unknown coil is similar to that described heretofore in connection with Fig. 1.

From the foregoing description of the apparatus and of its mode of operation, it is obvious that this invention involves and comprises improvements in portable impedance measuring apparatus, said improvements consisting in the use as a standard, of a toroidal type inductance coil having either an air core or else an iron core containing an air gap, whereby the possibility of magnetizing the standard inductance coil may be either entirely avoided or rendered extremely remote, thereby insuring greater accuracy of measurement, and avoiding the necessity for frequent recalibration of the standard coils. A further improvement consists in the use of variable ratio branches, having a wide range of ratios, instead of ratio branches having unity ratio, such as have been used heretofore, which renders it possible to use an air core inductance coil smaller in magnitude and in physical dimensions than would be possible if unity ratio branches were used.

Although the invention has been disclosed as embodied in a particular form and as having certain definite electrical constants, it is evident that it is not restricted to such form nor limited to such constants, and that it may be embodied in a variety of different forms, and have a wide range of electrical constants without departing from the spirit and scope of the claims hereof.

What is claimed is:

1. In a Wheatstone bridge system having a source of alternating electromotive force associated therewith, the combination of two differentially variable ratio branches comprising variable and fixed resistances, means associated therewith to indicate the ratio of the resistance in one of said branches to that in the other of said branches, a third branch adapted to include a coil of unknown inductance, a fourth branch containing an inductance coil of known value having a toroidal magnetic core rendered discontinuous by an air gap inserted therein, whereby the magnetic stability of said core is increased, and a variable resistance adapted for connection with either said third or said fourth branch whereby the effective inductance and the effective resistance of said coil of unknown value may be determined.

2. In a Wheatstone bridge system, having a source of alternating electromotive force associated therewith, the combination with two ratio branches of a third branch adapted to include a coil of unknown inductance, and a fourth branch containing an inductance standard comprising an inductance coil having a toroidal magnetic core rendered discontinuous by an air gap inserted therein, whereby the magnetic stability of said core is increased, and greater accuracy of measurement is assured.

3. In a Wheatstone bridge system having a source of alternating electromotive force associated therewith, the combination with two differentially variable ratio branches of a third branch adapted to include a coil of unknown inductance, and a fourth branch containing an inductance coil of known value, having a toroidal magnetic core rendered discontinuous by an air gap inserted therein, whereby the magnetic stability of said core is increased.

4. In a Wheatstone bridge system having a source of alternating electromotive force associated therewith, the combination with two differentially variable ratio branches of a third branch adapted to include a coil of unknown inductance, a fourth branch containing an inductance of known value, and means whereby the connections of said third and said fourth branch with said ratio branches may be electrically interchanged with respect to said ratio branches.

5. In electrical measurement apparatus of the Wheatstone balance type, the combination of a source of alternating electromotive force of telephonic frequency and substantially sine wave form connected between corresponding junctions of said balance; a variable resistance connected between the ratio branches of said balance divergent from one of said junctions; a contact forming one of said junctions and co-acting with said variable resistance to variably apportion the same between said ratio branches; a fixed resistance included in each ratio branch in series with its portion of said variable resistance; means for short-circuiting both of said fixed resistances; means associated with said variable resistance to indicate the ratio of the resistance in one to that in the other of said ratio branches; indicating means connected with the other pair of corresponding junctions of said system; a third branch adapted to include a coil of unknown inductance; a fourth branch containing a standard inductance coil; means for interchanging the electrical connections of said third and fourth branches with said ratio branches; an adjustable resistance; and means associated with the other of said first-mentioned junctions for connecting said adjustable resistance serially with either of the said third and fourth branches; whereby the system may be balanced electrically, and the value of the inductance and the effective resistance of the coil in said third branch determined.

6. In a Wheatstone balance having a source of alternating electromotive force associated therewith, the combination of two differentially variable ratio branches comprising variable and fixed resistances, a second variable resistance, means for connecting said second resistance into either of said ratio branches whereby the range of ratios of said branches may be increased, means associated with said ratio branches to indicate the ratio of the resistance in one to that in the other of said branches, a third branch adapted to include a coil of unknown inductance, a fourth branch containing a standard air core inductance coil, and a switch whereby said standard coil may be effectively disconnected from said fourth branch, an inductance coil, having a toroidal type iron core with an air gap therein adapted for connection with said fourth branch, a third variable resistance adapted for connection with either said third or said fourth branch, a fourth variable resistance, and means to connect said fourth variable resistance with either said third or said fourth branch whereby the value of the inductance and the effective resistance of the coil connected into said third branch may be determined.

7. The combination of a Wheatstone balance or system having a source of alternating electromotive force connected between two of its junctions, and indicating means between the other two of said junctions, with means for short-circuiting the fixed resistances of its ratio branches, means for transposing the connections between said ratio branches and the two remaining branches of said balance, an adjustable resistance at the junction of the said last-mentioned branches, and the said source; and switching means for transferring said adjustable resistance from either of said last-named branches to the other; substantially as set forth.

8. In a Wheatstone bridge system having a source of alternating electromotive force associated therewith, the combination of two differentially variable ratio branches comprising variable and fixed resistances, means associated therewith to indicate the ratio of the resistance in one of said branches to that in the other of said branches, a third branch adapted to include a coil of unknown inductance, a fourth branch containing an inductance coil of known value, having a toroidal magnetic core rendered discontinuous, whereby the magnetic stability of said core is increased, and a variable resistance adapted for connection with either said third or said fourth branch, whereby the effective inductance and the effective resistance of said coil of unknown value may be determined.

9. In a Wheatstone bridge system, having a source of alternating electromotive force associated therewith, the combination with two ratio branches, of a third branch adapted to include a coil of unknown inductance, and a fourth branch containing an inductance standard comprising an inductance coil having a toroidal magnetic core rendered discontinuous, whereby the magnetic stability of said core is increased and greater accuracy of measurement is assured.

In testimony whereof we have signed our names to this specification this first day of March, 1918.

OTTO B. BLACKWELL.
THOMAS SHAW.
CLEMENT J. KOUKOL.